Figure 3:
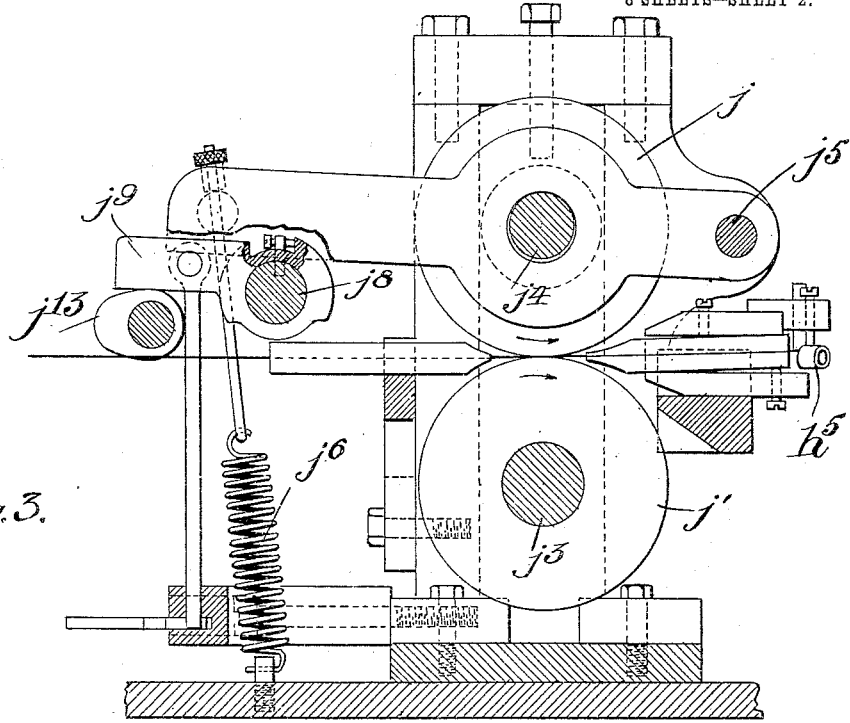

M. B. LLOYD.
METHOD OF MAKING COILED WIRE FABRIC.
APPLICATION FILED OCT. 22, 1908.
933,475.
Patented Sept. 7, 1909.
8 SHEETS—SHEET 1.
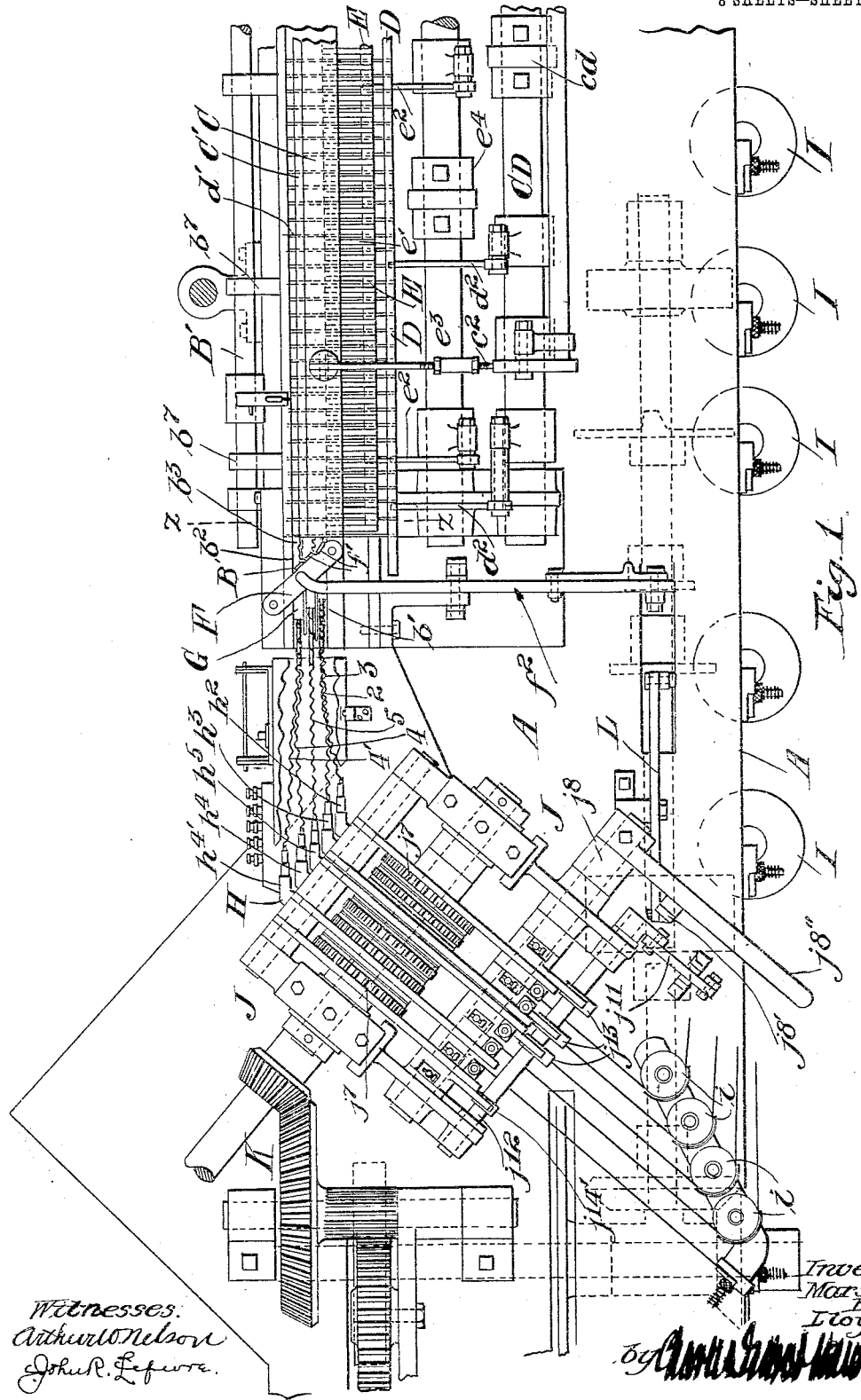

M. B. LLOYD.
METHOD OF MAKING COILED WIRE FABRIC.
APPLICATION FILED OCT. 22, 1908.

933,475.

Patented Sept. 7, 1909.

M. B. LLOYD.
METHOD OF MAKING COILED WIRE FABRIC.
APPLICATION FILED OCT. 22, 1908.

933,475.

Patented Sept. 7, 1909.

8 SHEETS—SHEET 3.

Witnesses:
Arthur W. Nelson
John P. Lefevre

Inventor:
Marshall B. Lloyd

M. B. LLOYD.
METHOD OF MAKING COILED WIRE FABRIC.
APPLICATION FILED OCT. 22, 1908.

933,475.

Patented Sept. 7, 1909.
8 SHEETS—SHEET 4.

Witnesses:
Arthur W. Nelson
John R. Lefevre.

Inventor:
Marshall B. Lloyd
by
Atty.

M. B. LLOYD.
METHOD OF MAKING COILED WIRE FABRIC.
APPLICATION FILED OCT. 22, 1908.

933,475.

Patented Sept. 7, 1909.
8 SHEETS—SHEET 5.

Witnesses:
Arthur W. Nelson
John R. Lefevre.

Inventor:
Marshall B. Lloyd
by [signature]
Atty.

M. B. LLOYD.
METHOD OF MAKING COILED WIRE FABRIC.
APPLICATION FILED OCT. 22, 1908.

933,475.

Patented Sept. 7, 1909.
8 SHEETS—SHEET 6.

Witnesses:
Arthur O. Nelson
John R. Lefevre

Inventor:
Marshall B. Lloyd
by [signature]
Atty.

M. B. LLOYD.
METHOD OF MAKING COILED WIRE FABRIC.
APPLICATION FILED OCT. 22, 1908.
933,475.
Patented Sept. 7, 1909.
8 SHEETS—SHEET 7.
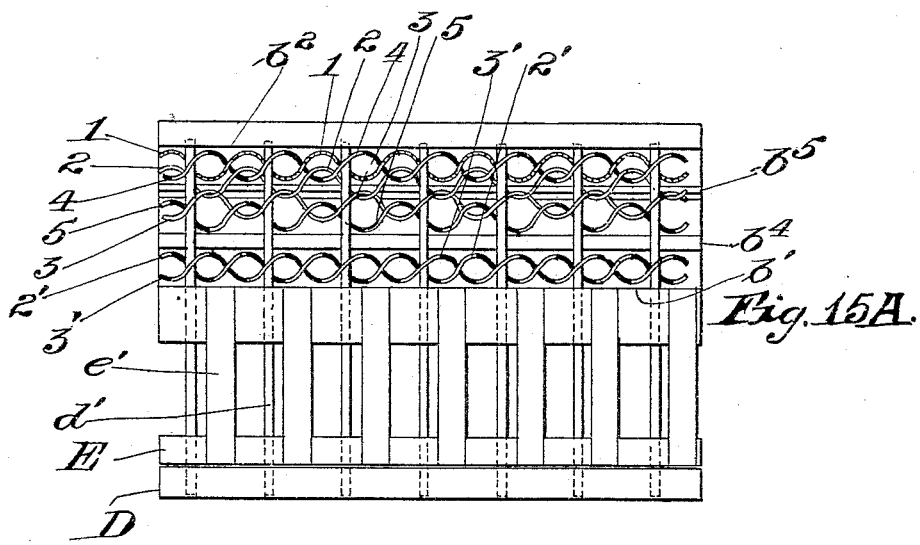
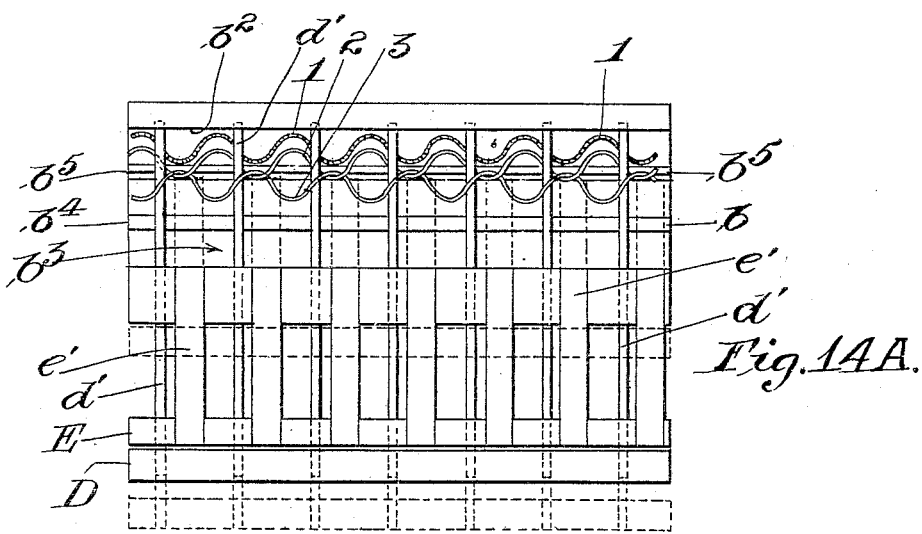
Witnesses:
Arthur W Nelson
John R. Lepore.
Inventor:
Marshall B. Lloyd
Atty.

M. B. LLOYD.
METHOD OF MAKING COILED WIRE FABRIC.
APPLICATION FILED OCT. 22, 1908.

933,475.

Patented Sept. 7, 1909.
8 SHEETS—SHEET 8.

Witnesses:
Arthur O Nelson
John R Lefevre

Inventor:
Marshall B. Lloyd
by [signature]
Atty.

UNITED STATES PATENT OFFICE.

MARSHALL B. LLOYD, OF MENOMINEE, MICHIGAN, ASSIGNOR TO THE LLOYD MANUFACTURING CO., OF MENOMINEE, MICHIGAN, A CORPORATION OF MICHIGAN.

METHOD OF MAKING COILED-WIRE FABRIC.

933,475.   Specification of Letters Patent.   Patented Sept. 7, 1909.

Application filed October 22, 1908. Serial No. 459,033.

*To all whom it may concern:*

Be it known that I, MARSHALL B. LLOYD, a citizen of the United States, and resident of Menominee, Menominee county, Michigan, have invented certain new and useful Improvements in Methods of Making Coiled-Wire Fabric, of which the following is a full, true, clear, and exact description.

My invention relates to improvements in the art of manufacturing so-called coiled wire fabrics of the kind, for example, used in the manufacture of wire mattresses.

The object of my invention is to enable the more rapid and economical production of coiled wire fabrics.

Hitherto it has been the custom to weave coiled wire fabrics by adding coils one at a time to the edge of the fabric. My purpose is to weave or add two or more coils to the fabric, at a time, *i. e.*, during the time or period ordinarily occupied in adding a single coil thereto; and to thus enable a single operator to produce with a single machine several times the amount of fabric which it has hitherto been possible to make with one weaving mechanism.

My invention consists broadly in securing a pre-formed coil in parallelism and in substantial contact with the edge coil of a coiled wire fabric and then coupling these juxtapositioned coils by means of another coil, thereby adding two coils to the fabric in one operation, the positioning of the coils and the running in of the coupling or interlocking coil being accomplished in substantially the same length of time that is ordinarily consumed in adding a single coil to a fabric.

My invention also contemplates and includes the pre-forming of a reserve coil or coils at the same or about the same time that the juxtapositioned coils are coupled as above described, to the end that a reserve coil shall be put in readiness to be coupled to the new formed edge of the fabric by the next coupling coil.

Further my invention contemplates the patterning of the fabric by the interruption of the regular operation and the running in of additional coils at predetermined times, to form so-called cords in the fabric.

More specifically defined my invention consists in the simultaneous or substantially simultaneous addition of one section of fabric to the main fabric body and the formation of another or reserve section of fabric; and also consists in the feeding up of the reserve section to position it for the reception of a coupling coil and to make room for the weaving of the next reserve section.

The terms " fabric ", " main fabric " and " body fabric " as herein used define the body, quantity or amount of coiled wire fabric already formed at the instant of the beginning of the process or cycle of steps, in other words the fabric which is ready to receive additional coils. The terms " section of fabric ", " section ", and " fabric section " as herein used are intended to define or embrace either a single coil or several interlocked coils; for, as will be better explained hereinafter, my invention may be carried out in several ways; for example, a single coupling coil and a single reserve coil may be formed at each operation; again while these are being formed a third coil or coils may be woven into or interlocked with the coil which is being coupled to the body of the fabric; or, in another case the reserve section may comprise several interlocked coils instead of a single coil. In practice it is most convenient to weave in or run either two or four wires at each operation, but I find it possible to run or weave a greater number at a time, the ability to add broad breadths to the fabric at one operation, being limited only by the accuracy of the machine utilized in carrying out the invention and the ability of the operator to care for and watch the many parts of and the many coils in such a weaving machine.

I shall herein refer more especially to the making of a " single " fabric; that is, a fabric which is made up of single coils, each interlocked or interwoven with adjacent single coils. My reason for referring to " single " fabrics is that the invention is most easily understood and described in connection with the making of " single " coil fabrics, but those who are skilled in the art will at once understand that double, triple or multiple coil fabrics and also composite fabrics may be made in the same manner. Double and triple coil fabrics are made by running either two or three coils as one coil, the groups, of two or three coils each, having exactly the same relation to one another as do the single coils of a " single " fabric. Therefore when a single coil is hereinafter referred to, it should be understood as standing for either a single coil or for two or more coils having a common axis and hence capable of being handled and referred to as a single coil.

My invention will be more readily understood by reference to the accompanying drawings, forming a part of this specification, in which I have illustrated the machine which I find best suited to the purposes of the invention.

Figure 2:
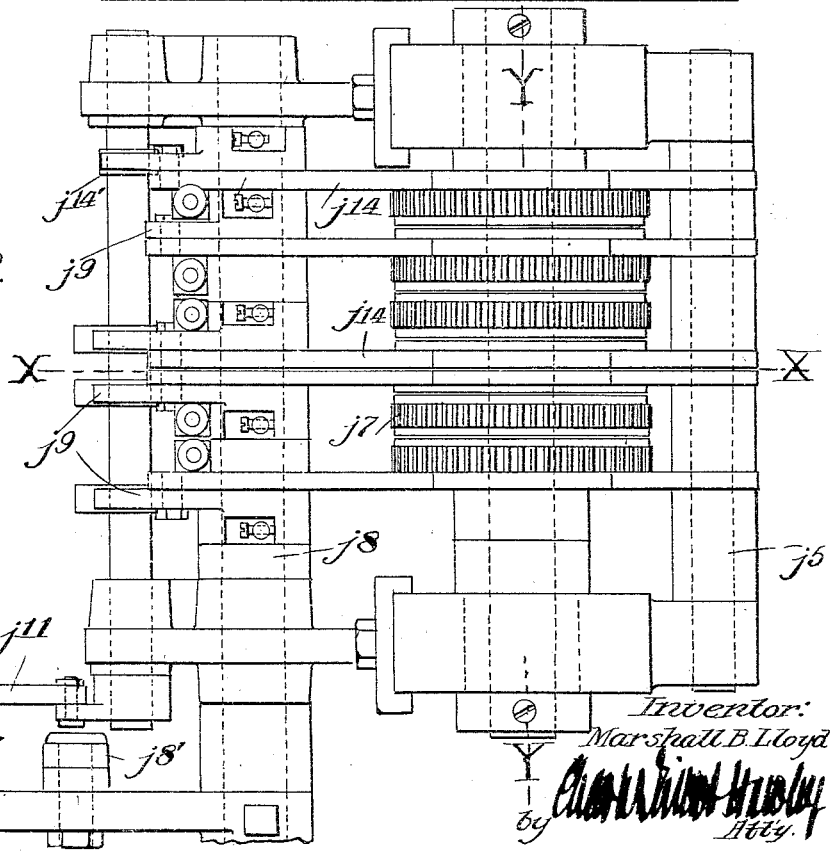
Figure 4:
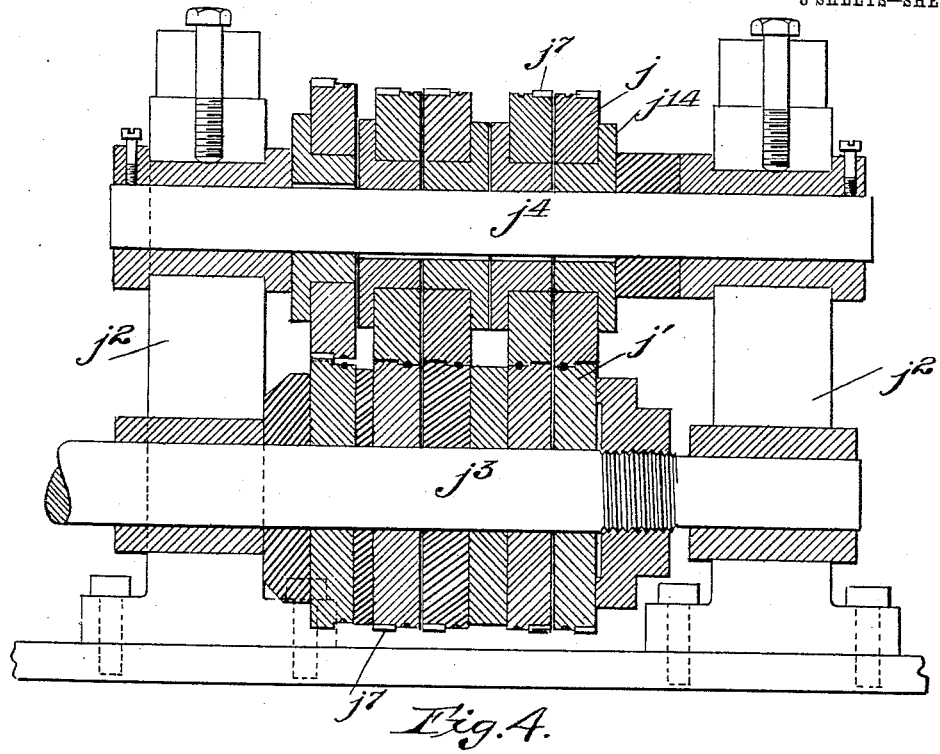
Figure 5:
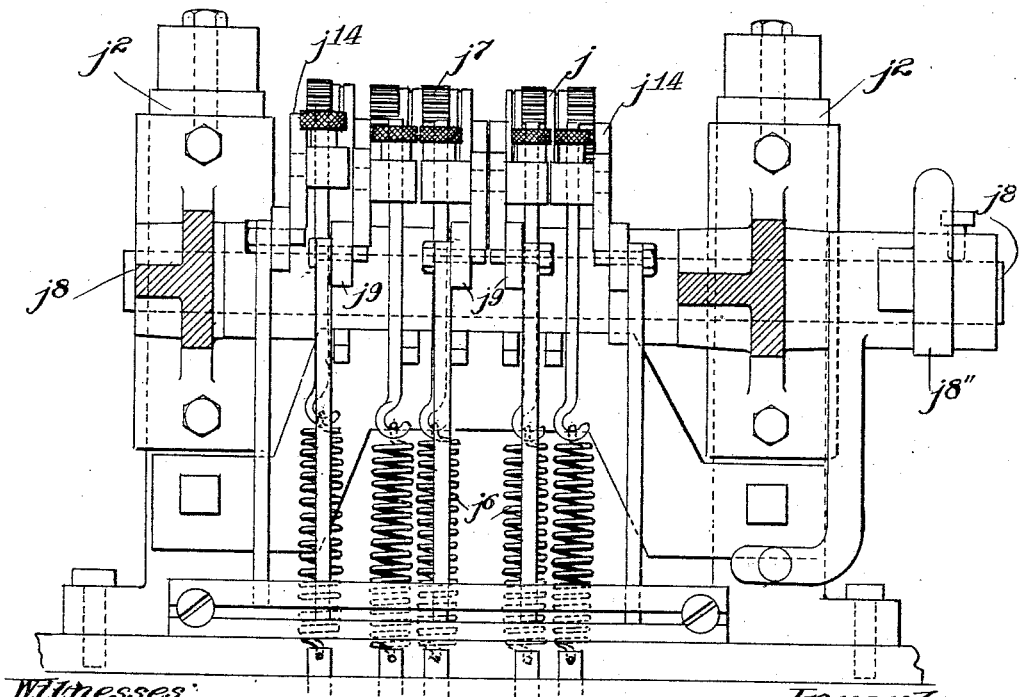
Figure 6:
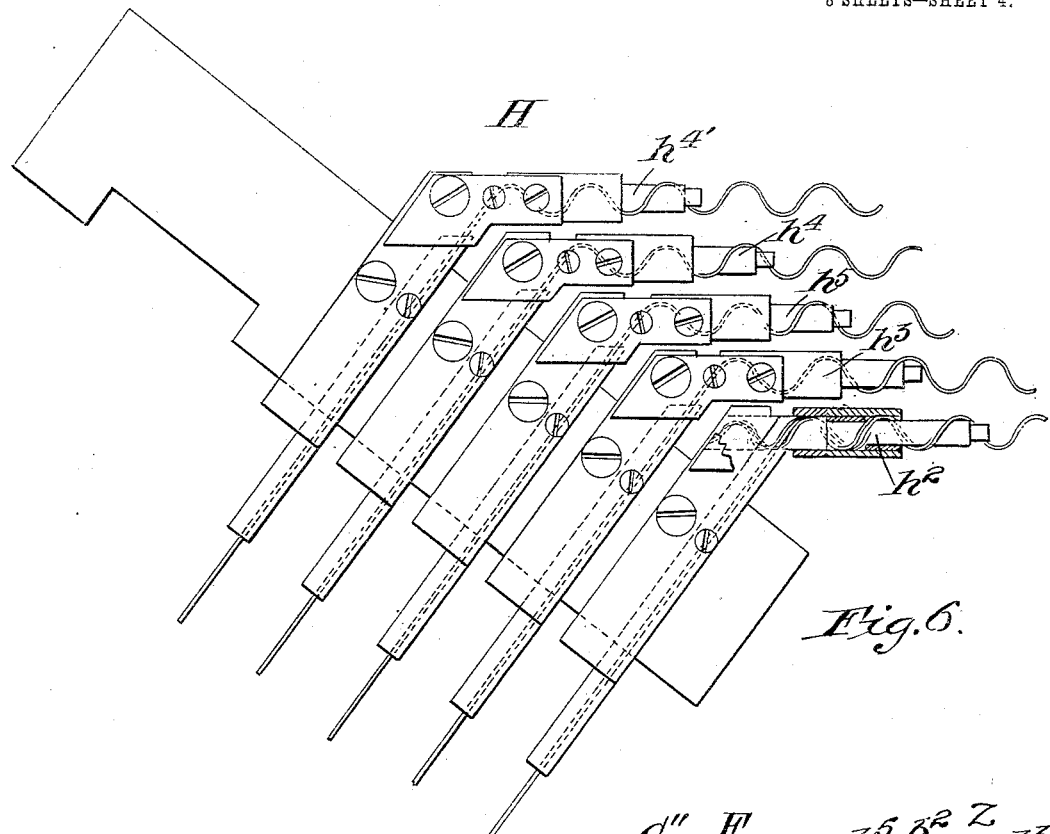
Figure 7:
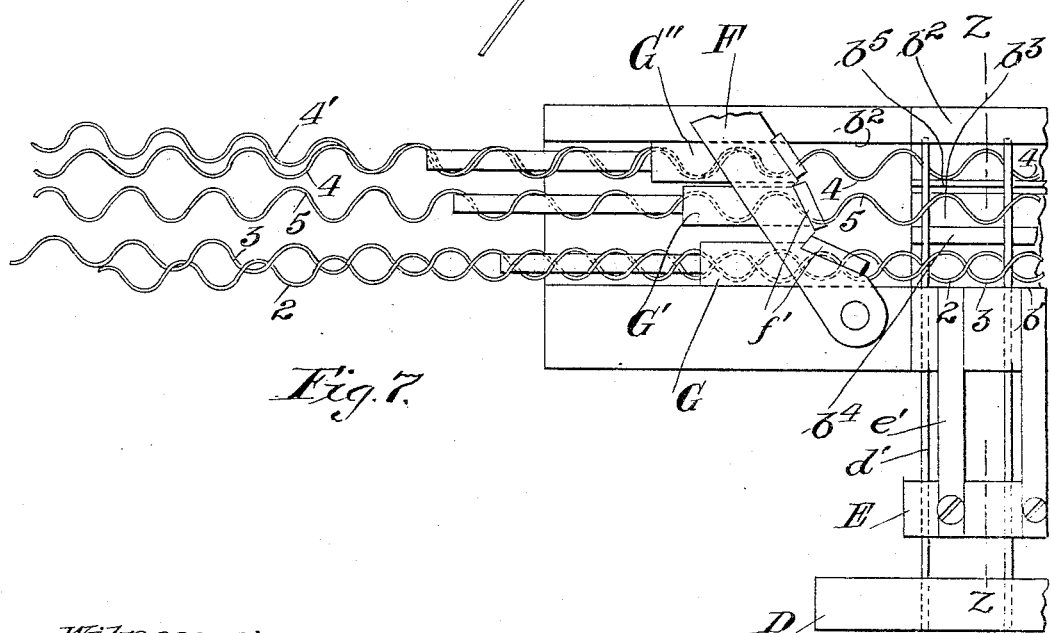
Figure 8:
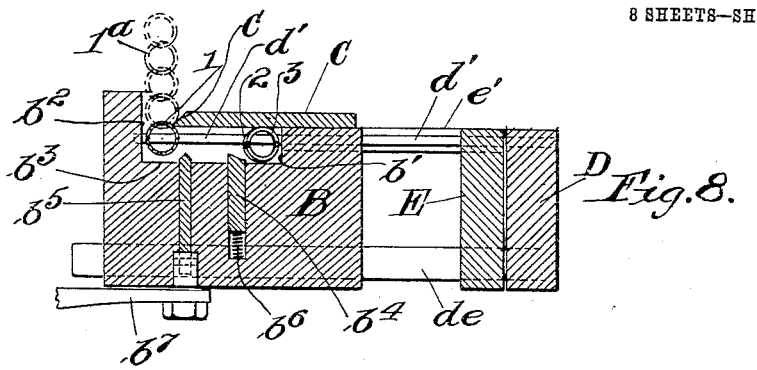
Figure 13:
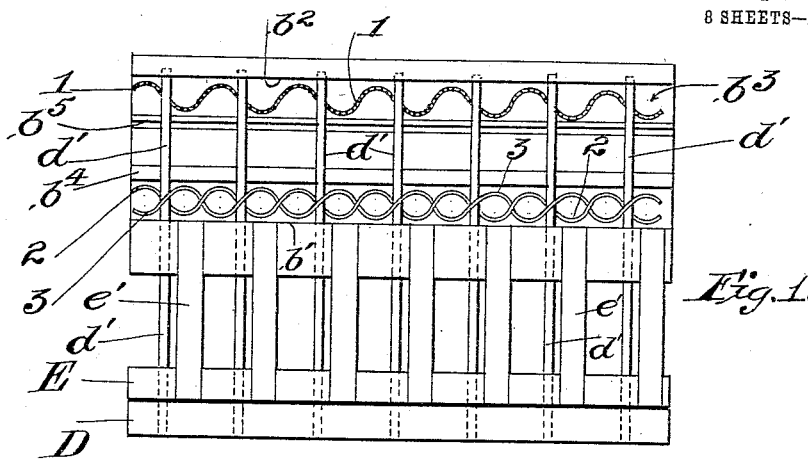
Figure 14:
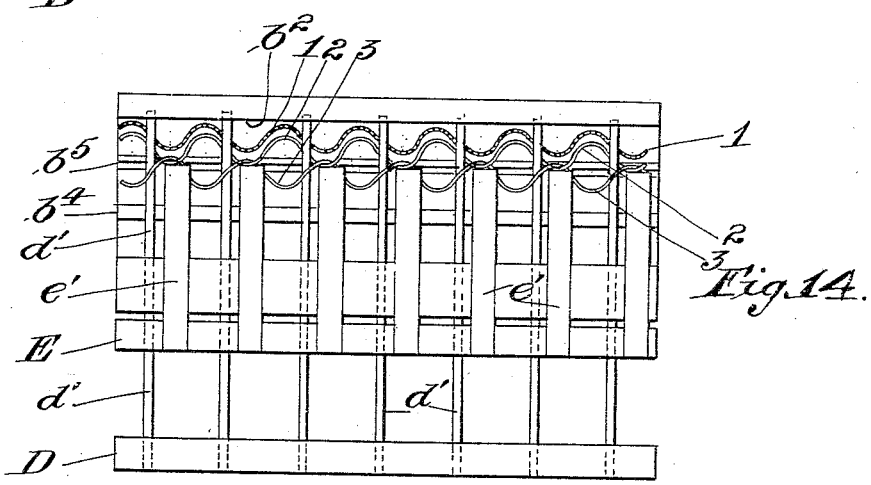
Figure 15:
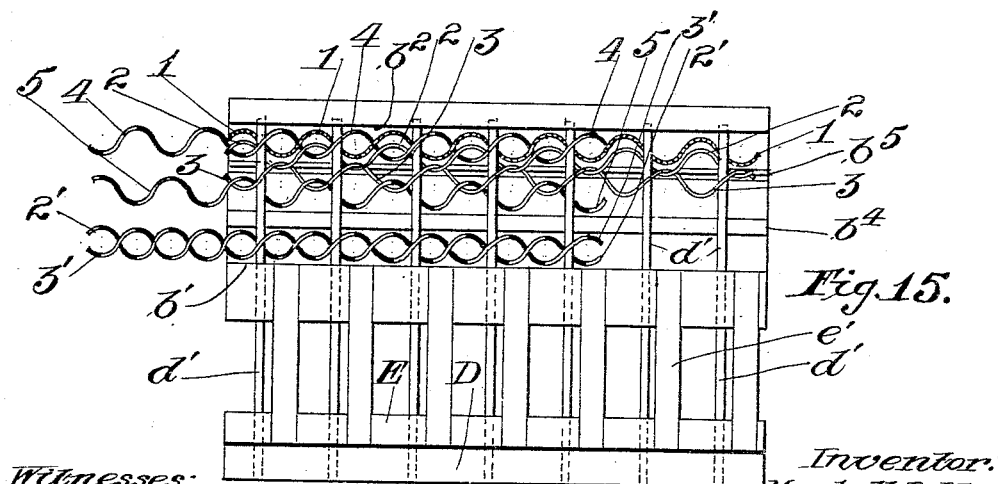
Figure 16:
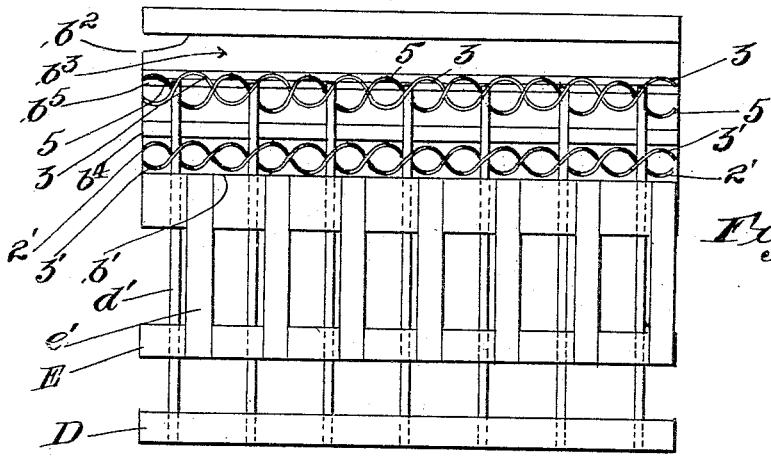
Figure 17:
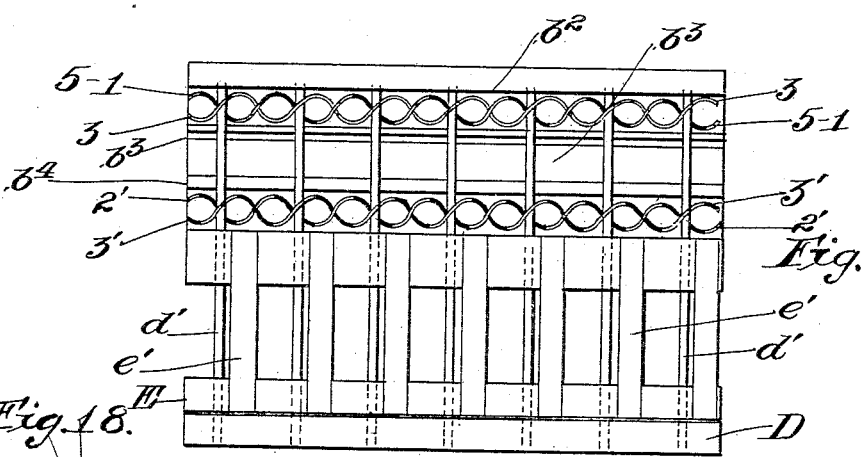
Figures 11, 18:
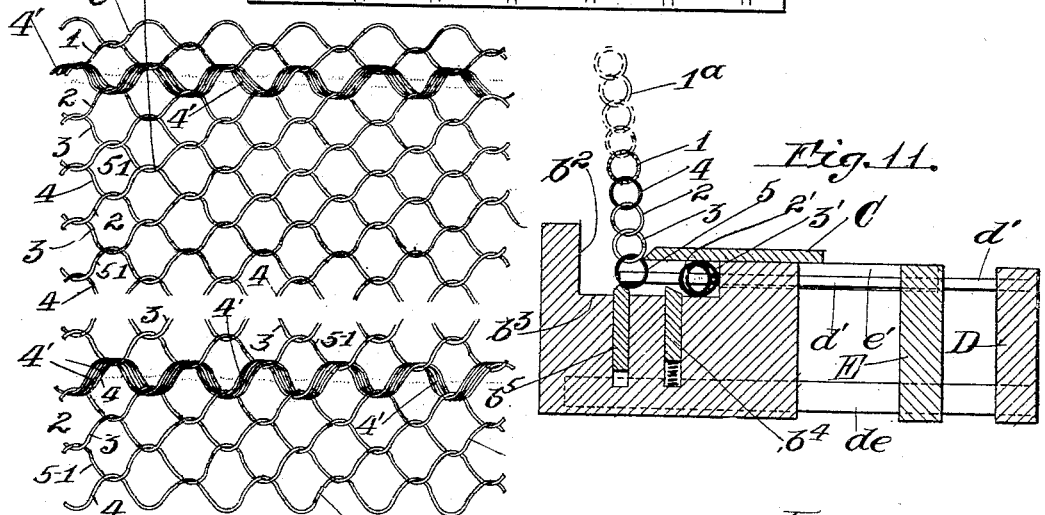

Figure 1 is a plan view of a coiled wire fabric weaving machine adapted to the performance of my invention; Fig. 2 is an enlarged plan view of the wire propelling or feeding head of the machine, containing the feed rolls; Fig. 3 is a sectional view thereof on the line X—X of Fig. 2; Fig. 4 is a sectional view on the line Y—Y of Fig. 2; Fig. 5 is a rear end elevation of the wire feeding head; Fig. 6 is an enlarged plan view of the coilers; Fig. 7 is a similar enlarged plan view of the weaving tube or channel, the coil guides and the cut-off knives; Fig. 8 is an enlarged sectional view of the weaving channel on the lines Z—Z of Figs. 1 and 7, showing the positions of the parts and of the coils at the instant of the completion of one operation and the beginning of another; Figs. 9, 10, 11 and 12 are similar views depicting other, successive, stages or steps of the invention; Fig. 13 is a diagrammatic plan view taken from Fig. 8; Figs. 14 and 14$^A$ are similar views taken from Fig. 9; Figs. 15 and 15$^A$ are plan views of Fig. 10; Fig. 16 is a plan view of Fig. 11; Fig. 17 is a plan view of Fig. 12; and Fig. 18 illustrates a piece of finished fabric, containing cords.

The apparatus or mechanism herein illustrated is an automatic weaving machine that I have devised for carrying out my improvement in the art of weaving coiled wire fabrics. Only such parts of the mechanism are shown as will be helpful in describing and understanding the present invention.

The complete machine constitutes the subject matter of my companion application, Serial No. 468,388, filed December 19, 1908, in which it is fully set forth and claimed. This particular machine operates in conformity with my novel method or process and is adapted to add four coils to the fabric at each operation. By slight modification it may be adapted to the simplified performance of my invention, by which but two coils are added at a time and likewise, by modification, it may be adapted to handle a greater number of coils.

In the drawings, A, represents the table or frame of the machine. On the table is a long channel or coil receiver, B, in which the weaving operation takes place.

$b'$, $b^2$ and $b^3$ are respectively the front and back walls and bottom of the channel.

$b^4$ and $b^5$ are spacing or escapement bars in the bottom of the channel, the former being supported by springs, $b^6$, and the latter being arranged for operation by arms, $b^7$. The arms, $b^7$, take motion from the rocking shaft, B' on the back of the machine.

C is a member which partially closes the channel, B. It is provided with a V or knife edge, C', and is hereinafter referred to as the channel closure or knife edge. By means of mechanism, $c^2$, the knife edge is periodically moved back and forth across the channel.

D is a member having a large number of pins, $d'$, which pass through the side, $b'$, of the channel and extend across the channel. These pins, $d'$, serve to secure and space the turns of the coils in the channel. A mechanism, $d^2$, periodically moves the pins transversely in the channel. A member, E, bears a number of short bars or fingers, $e'$, which extend through or across the wall, $b'$, of the channel and are adapted to be projected across the same to shift certain coils therein. Guide pins, $de$, serve to support the members, D and E. A mechanism, $e^2$, is employed for moving the member, E. The shaft, $e^3$, is a part of the mechanism, $e^2$, and is operated by the lever, $e^4$. A shaft, CD, actuated by a lever, $cd$, is the means employed for operating the parts, $c^2$ and $d^2$, the arrangement being such that the closure, C, moves at a more rapid rate and through a greater distance than the pins, $d'$.

F is a knife head bearing a plurality of cutting knives, $f'$, for severing the coils in the channel. It is operated by a lever, $f^2$.

G, G', G'', are coil guides, in the receiving end of the channel. These guides serve to space the coils apart in the channel. Their ends co-act with the knives, $f'$.

H represents a bank of coilers adjacent to the receiving end of the channel. In this machine I employ five coilers, $h^2$, $h^3$, $h^5$, $h^4$ and $h^{4'}$. The first four are used in weaving the fabric and the fifth coiler, $h^{4'}$, is used in forming the cords in the fabric. Five wires extend from five reels, I, to respective coilers, the same passing over the interposed sheaves $i$.

J is a wire propelling head which is arranged between the coilers and the sheaves, $i$, containing driving rolls which force the wires through the coilers. A pair of driving rolls, $j$, $j'$, is provided for each wire and these rolls are so arranged that, while in rotation, they may be separated to free the wire and cease the propulsion thereof through the coiler, or may be forced upon or against the wire, to drive the same through the coiler.

A mechanism which operates in time with the knives and the moving members of the weaving channel, periodically closes the rolls together to run coils into the channel and then opens or spreads the rolls to stop the wires and give time for the operation of the knives and channel members. A pattern mechanism associated therewith, at longer periods, interrupts the channel operations, throws several of the pairs of rolls out of action and causes the repeated operation of one or more pairs of rolls, to form a cord in the fabric. The mechanisms by which these operations are brought about will be best understood by reference to Figs. 1 to 5 inclusive. On the table, A, are standards, $j^2$, which contain bearings for the two shafts, $j^3$ and $j^4$. The lower shaft, $j^3$, is driven continuously by gearing, K; the upper shaft is not driven being simply a guide and stop part. The rolls, $j'$, are fastened to the shaft, $j^3$, and therefore rotate continuously. Each of the upper rolls is carried by its own lever, $j^{14}$. The levers are pivoted on the cross rod, $j^5$, and at their free ends are attached to springs, $j^6$. These springs tend to force the rolls together. The pairs of rolls are joined by gears, $j^7$, whereby the lower roll drives the upper roll in each case. A shaft, $j^8$, carried by the standards is equipped with a plurality of arms or cams, $j^9$, one for each lever, $j^{14}$. Mechanism, L, connected with the shaft, $j^8$, by the link, $j^{8'}$, and the lever, $j^{8''}$, operates the cams, $j^9$, periodically to separate the rolls in advance of the operation of the knife head, F, and close them together after the operation of the channel parts. The pattern mechanism, whereof, $j^{11}$, is the operating connection, includes the rock shaft, $j^{12}$, and its cams, $j^{13}$, $j^{13}$, $j^{13}$ and $j^{14'}$. These cams engage corresponding arms, $j^9$. The cams, $j^{13}$, are disengaged from their arms when the cam, $j^{14'}$, is raised or engaged with its arm and vice versa. The rocking shaft, $j^8$, operates regularly, whereas the rocking shaft, $j^{12}$, operates only at times when cords are to be formed or have been finished. These times are determined by a pattern cam, not shown, and mechanism which is associated with the cam interrupts the action of the parts, C, D and E, until the cord is completed.

It will be understood that during the cording period, the knife head, F, the driving rolls, and the wire stopping and starting shaft, $j^8$, continue in regular operation. In the present machine the pattern shaft, $j^{12}$, normally holds in elevated position the lever of the driving rolls corresponding to the fifth coiler, $h^{4'}$. Its arm therefore is not affected by the rocking of the shaft, $j^8$. It will be noted that the lever belonging to the rolls of the coiler, $h^4$, is not represented by a cam on the shaft, $j^{12}$. When the pattern shaft, $j^{12}$, is turned, it lowers the lever of the fifth pair of rolls (belonging to coiler, $h^{4'}$) and raises the levers of the first three pairs, i. e., those belonging to coilers, $h^2$, $h^3$ and $h^5$. The lowering of the fifth lever places its rolls in operation along with those of the fourth lever and until the pattern shaft is restored the fourth and fifth levers and their rolls take up the normal operation together, while the remaining levers and rolls remain idle. Thus by stopping three of the pairs of rolls, by throwing the channel members out of action and by putting two sets of rolls into action, I am able to run in the number of coils which may be required to form a cord in the fabric. During the regular operation of the machine and at the beginning of its cycle of movements, the parts occupy the positions shown in Fig. 1. At such moment the knives are raised or out of action, and the pairs of rolls belonging to the coilers, $h^2$, $h^3$, $h^5$ and $h^4$, are in action, i. e., coils are being run into the channel. An instant later, coils of proper length having been run into the channel, the mechanism L, moves the shaft, $j^8$, and separating the rolls causes the stoppage of the wires in the coilers. This is followed by the cut-off action of the knife head, F. Then the members D and C are drawn back by the rocking of the shaft, CD, to free the new section of fabric which has been formed in the channel, in the manner more fully defined hereinafter. The fabric having been freed, the members, C and D, return to position and the member, E, moves forward to shift the reserve coils forward in the channel. Having done this the member, E, returns to the position shown in Fig. 1, marking the end of the cycle; the mechanism, L, immediately thereafter restoring the rolls to engagement with the wires, to institute the coil forming step or stage of the next cycle. The pattern mechanism may begin its operation at the end of this coil-forming stage in some cycle (as predetermined by the form of the pattern cam). The channel members and the first three driving rolls (and coilers, $h^2$, $h^3$ and $h^5$) having been thrown out of step (as before described) the last two rolls (and coilers, $h^4$ and $h^{4'}$) are operated one or more times, (according to the pattern), to run or weave two or more additional coils in the section of fabric then lying in the channel. Following the formation of a cord in this manner, the channel members, C, D, and E operate (in the manner before described) to release the fabric and position the reserve coils, preparatory to the next regular cycle of movements.

Figure 9:
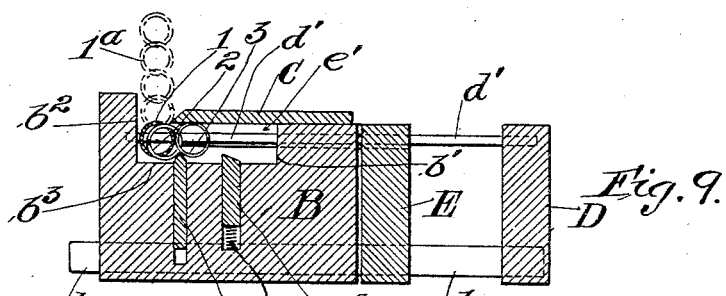

The character and operation of the mechanism being now understood, the process which is performed thereby may be described and will be best understood upon reference to Figs. 8 to 18. These are diagrammatic views in which I have depicted the several principal and intermediate steps or stages of the invention. Figs. 8 and 13 show the channel, B, and the parts C, $d'$, $e'$, $b^4$ and $b^3$, in the relation or positions occupied, at the instant following the liberation of a new section of fabric; when the knife edge, C', and the pins, $d'$, have returned to normal positions and before the coil transferring fingers, $e'$, have operated. For clearness the knife edge is omitted in Fig. 13. The coils, $1^a$, (dotted lines Fig. 8) represent the body of the fabric, which rises from the channel, being held in such position by slight tension from above. The lowest or edge coil of the fabric is marked 1. This coil is held in the channel by the knife edge, C', and the pins, $d'$. The reserve coils are indicated by the numerals 2 and 3. The coil 1 and the reserve coils 2 and 3 are at opposite sides of the channel and are separated by the members, $b^4$ and $b^5$. Coils 2 and 3 are interlocked with the pins, $d'$, and they are also relatively interlocked; being at this time substantially coincident (as to their axes) and one being a half pitch or turn in advance of the other. It may be here explained that the coilers, $h^2$, $h^3$, and the guide, G, are formed to weave the coils 2 and 3 in this manner. It should also be noted that the coil, 2, is parallel to the edge coil, 1, whereas the coil, 3, is not parallel, being a half turn out of line or step with respect to the edge coil. Having positioned the coils, 1, 2 and 3 in this manner, I next transfer the coils 2 and 3 across the channel, and "set" or leave the coil, 2, along-side of or against the edge coil, 1, i. e. I nest the coils 1 and 2 by placing them in parallelism and substantial contact, so that their spirals are substantially parallel. This I do by means of the fingers, $e'$, which being moved forward, as shown in Figs. 9 and 14, engage the coil 2, and push the same over the bars, $b^4$ and $b^5$. The coil, 3, being interlocked with the coil, 2, is transferred with it. The bar, $b^4$, prevents the accidental displacement of the reserve coils in the channel, and being spring supported, yields to the passage of the coils under the propulsion of the fingers, $e'$. The member, $b^5$, is positively supported and is positively retracted during the transference of the coils. It is held down until the coil, 2, passes over it and is then restored to raised position to hold the coil, 2, in engagement with coil, 1, and to spread the coils, 2 and 3, as shown in Figs. 9 and 14; this last being a precaution against the accidental interlocking of the coil, 3, with the edge coil, 1, by the coupling coil about to be described.

Figure 10:
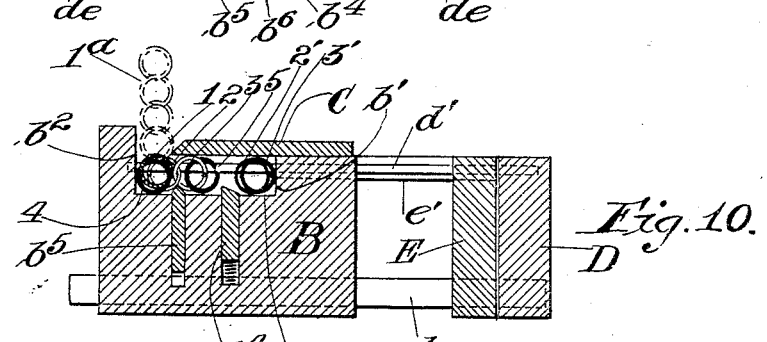
Figure 12:
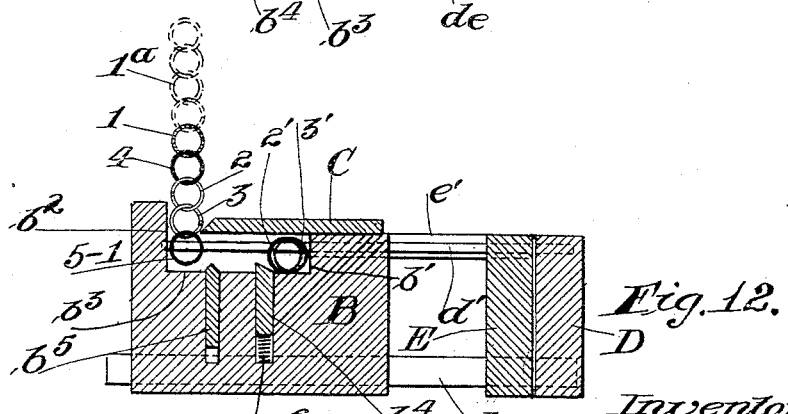

After the fingers, $e'$, have transferred the coils as depicted in Fig. 14, they are returned to normal position as shown in Fig. $14^A$, the coils remaining as there shown. I have hereinbefore described the cycle of operations as beginning with the running of the four coils. This step is depicted in Figs. 10, 15 and $15^A$, and begins after the coils, 1, 2 and 3 have been juxtapositioned in the manner next above described and shown in Figs. 9, 14 and $14^A$. The four coils alluded to are the coils 4 and 5 and the coils, 2' and 3'. These coils are woven as shown in Fig. 15 and the new reserve coils 2', 3', obviously occupy the position vacated by the preceding reserve coils, 2 and 3. The coil, 4, is the interlocking or coupling coil, and runs in the portion of the channel between the member, $b^5$, and the wall, $b^2$. It is a half-pitch or turn "behind" the parallel, juxtapositioned coils 1 and 2 and serves to interlock them, as clearly shown in Figs. 10 and 15. The coil, 5, runs in the portion of the channel between the members, $b^4$ and $b^5$, and interlocks with the coil, 3; and as the coil 5, is to become the edge coil of the fabric its relation to the pins, $d'$, and the other coils correspond to that of the coil 1.

Fig. $15^A$, depicts the completion of the running or weaving of the coils, 4, 5, 2' and 3'. Obviously the running in of coils 4 and 5 adds four coils to the edge of the fabric, inasmuch as the coil, 4, attaches the coils, 2 and 3 to the coil, 1, and the coil, 5, is attached to or interlocked with the coil, 3. The cycle of operations is most conveniently described as beginning with the simultaneous running in of the four coils, but from another view point the addition of four new coils to the fabric may be said to begin with the moving over of the reserve coils and to end with the running in of the coils, 4 and 5, the running of the new reserve coils, 2' and 3', being in this sense a preparatory or incidental step. Immediately after running in the coils, 4, 5, 2' and 3', I withdraw the newly completed portion of the fabric from the channel, as depicted in Figs. 11 and 16. This is accomplished by retracting the pins, $d'$, and the knife edge or closure, C'. As these parts are drawn back, successive coils, 1, 4, 2 and 3, are released and as the fabric $1^a$, is under tension, the coils are lifted out of the channel. The parts, $d'$ and C are not drawn back far enough to release the coil, 5, but co-act with the member, $b^5$, to retain it in the channel. It will be evident that the reserve coils, 2' and 3', are not disturbed by the movement of the parts C and $d'$. Upon releasing the coils, 1, 2 and 3, I transfer the coil, 5, to the portion of the channel previously occupied by the coil 1. For this purpose the member, $b^5$, is retracted, and the pins, $d'$, and the member, C, are restored to normal position. The pins, in moving, carry the coil, 5, across the channel and against the wall, $b^2$, thereof. The channel parts and the coils will then present the appearance shown in Figs. 12 and 17. For the sake of clearness I have marked the last coil, 5—1 in Figs. 12 and 17, to show that it is the coil previously referred to as coil, 5, but has become the new edge coil, 1. This point or stage may be termed the end of the weaving process, inasmuch as the coils, 5—1, and 2', 3', occupy the positions first described with the coils, 1, 2 and 3 in Fig. 8. But in the other sense, above referred to, the cycle or process may be said to be still unfinished and not completed until the new reserve coils, 2' and 3' have been moved over against the edge coil in the manner depicted in Fig. 9; in which position the coils and the channel are in readiness to receive four new coils. Both ways of viewing and defining the inventions are obviously correct. The latter is perhaps the most convenient when considering that phase of the invention which includes the cording of the fabric, for this step takes place preferably after the steps depicted in Figs. 9 and 10. In other words, after running in the four new coils as shown in Fig. 10, I interrupt the sequence of operations depicted in Figs. 10, 11 and 12, and interpose the cording step. To do this I leave the parts in the positions of Figs. 10 and 15^A, and stopping the operation of the coilers which furnish the coils, 5, 2 and 3, run in additional coupling coils from the coilers, $h^4$ and $h^{4'}$. These coils become the coils, 4' (see Fig. 18) and with the previous coil, 4, constitute the cord; all being interposed between and interlocked with the edge coil, 1, and the adjacent coil, 2.

It must now be evident that my invention is capable of considerable modification. For example, the edge coil of the fabric may be held and a single reserve coil may be pushed against it, or vice-versa, and then a single coupling coil may be run in simultaneously with the placement of a new reserve coil; thus adding two coils to the fabric at a time. Again it is a simple matter to increase the fabric three coils at a time by simply omitting the coil, 5, and providing for the proper placement and relation of the then terminal coil, 3, and the new reserve coil, 2. It is obvious also that more than two reserve coils may be simultaneously formed and moved over for attachment to the edge coil; and also, several interlocked coils may be added to or take the place of the added coil, 5. It will also be obvious that my invention is performable with multiple coils, in which case two or more coils take the place of each or any one single coil hereinbefore described. As these and other modifications of my invention will readily suggest themselves to one who is skilled in the art, I do not confine the invention to the specific steps, processes or modifications herein illustrated and described. I desire also that it be understood that the invention is in no wise limited to the herein-described mechanism but may be carried out manually and by the use of mechanical aids of many kinds.

Having thus described my invention, I claim as new and desire to secure by Letters Patent:

1. The improvement in the art of weaving coiled wire fabric that consists in nesting or securing a pre-formed coil in parallelism and in substantial contact with the edge coil of a fabric body and then coupling said pre-formed and edge coils by means of another coil, thereby in one operation adding two coils to the fabric, substantially as described.

2. The improvement in the art of weaving coiled wire fabric that consists in securing a pre-formed coil in parallelism and in substantial contact with the edge coil of a fabric body, then coupling said pre-formed and edge coils by means of another coil and pre-forming at substantially the same time another coil, thereby in one operation adding two coils to the fabric body and placing another coil in readiness to be added thereto, substantially as described.

3. The improvement in the art of weaving coiled wire fabric that consists in securing a pre-formed coil in parallelism and in substantial contact with the edge coil of a fabric body, then coupling said pre-formed and edge coils by means of another coil, pre-forming at substantially the same time another coil, thereby in one operation adding two coils to the fabric body and placing another coil in readiness to be added thereto, and then positioning the new edge coil of the fabric body to receive the newly pre-formed coil, substantially as described.

4. The improvement in the art of weaving coiled wire fabric that consists in nesting or securing a pre-formed coil in parallelism and in substantial contact with the edge coil of a fabric body, then coupling said pre-formed and edge coils and forming a cord in the fabric by running in or interposing a plurality of interlocking coils, substantially as described.

5. The improvement in the art of weaving coiled wire fabric that consists in securing a pre-formed coil in parallelism and in substantial contact with the edge coil of a fabric body, then coupling said pre-formed and edge coils and forming a cord in the fabric by running in or interposing a plurality of interlocking coils, and at substantially the same time pre-forming another coil adjacent to the new edge of the fabric, substantially as described.

6. The improvement in the art of weaving coiled wire fabric that consists in securing a pre-formed coil in parallelism and in substantial contact with the edge coil of a fabric body, then coupling said pre-formed and edge coils and forming a cord in the fabric by running in or interposing a plurality of interlocking coils, at substantially the same time pre-forming another coil adjacent to the new edge of the fabric, and then positioning the new edge coil of the fabric to receive the newly pre-formed coil, substantially as described.

7. The improvement in the art of weaving coiled wire fabric that consists in the juxtaposing of the edge coil of a fabric body and a pre-formed coil, the substantially simultaneous running in of coupling and reserve coils, and the positioning of the new edge of the fabric body to receive the reserve coil or coils, substantially as described.

8. The improvement in the art of weaving coiled wire fabric that consists in pre-forming a coil, then securing the same in parallelism and in substantial contact with the edge coil of a fabric body, then coupling said pre-formed and edge coils by means of another coil and simultaneously pre-forming and positioning a reserve coil, then releasing the fabric, and then juxtapositioning the new edge coil of the fabric and the reserve coil in readiness to receive the next coupling coil and so on, until the desired quantity of fabric is completed, substantially as described.

9. The improvement in the art of weaving coiled wire fabrics that consists in securing a pre-formed coil in substantial longitudinal non-interlocked contact with the edge coil of a fabric body, then coupling said pre-formed and edge coils by means of another coil, and then releasing the fabric and securing the new edge coil in readiness to receive the next pre-formed and coupling coils, substantially as described.

10. The improvement in the art of weaving coiled wire fabrics that consists in placing the edge coil of a fabric body and a pre-formed coil in longitudinal non-interlocked substantial contact, then coupling said coils by means of an interlocking coil, and finally positioning or pre-forming another coil adjacent thereto in readiness to be juxtaposed to the new edge coil of the fabric constituted by the previous pre-formed coil, substantially as described.

11. The improvement in the art of weaving coiled wire fabrics which consists in securing or holding the edge coil of a woven wire fabric, meantime positioning a second coil in parallelism therewith, then moving said second coil against said edge coil, then running a third coil into said coils to couple or interlock the same and also forming a reserve coil in the place previously occupied by the pre-formed coil, then releasing said edge coil and moving said pre-formed coil to the position previously occupied by said edge coil, substantially as described.

12. The improvement in the art of weaving coiled wire fabrics that consists in securing the first or edge coil of a woven wire fabric, securing a second coil beside it in parallel but non-interlocked relation thereto, coupling said coils by weaving a third coil into them, placing a fourth coil beside said second coil in readiness to take its place, releasing said edge coil, and securing said second coil in readiness to receive said fourth coil, substantially as described.

13. The improvement in the art of weaving coiled wire fabrics which consists in securing the first or edge coil of a fabric body, then juxtaposing the first coil of a pre-formed fabric section against said edge coil, then forming or weaving, adjacent to the last coil of said section, a reserve pre-formed fabric section having as many coils as the first mentioned section, and simultaneously running coils into the juxtaposed first coils and the last coil of said first mentioned section, then releasing the completed fabric and positioning its new edge coil to receive the first of the coils of the second mentioned section, and then repeating the foregoing steps in sequence until the fabric is completed, substantially as described.

14. The improvement in the art of weaving coiled wire fabrics which consists in securing the first or edge coil of a fabric body, then juxtaposing the first coil of a pre-formed fabric section against said coil, then forming or weaving, adjacent to the last coil of said section, a reserve pre-formed fabric section having the same number and arrangement of coils as the first-mentioned section, and simultaneously running coils into the juxtaposed first coils and the last coil of said first-mentioned section, then releasing the completed fabric and positioning its new edge coil to receive the first of the coils of the second-mentioned section, and then repeating the foregoing steps in sequence until the fabric is completed, substantially as described.

15. The improvement in the art of weaving coiled wire fabrics that consists in connecting one section of fabric to a main body of fabric and simultaneously forming a reserve section for subsequent connection, substantially as described.

16. The improvement in the art of weaving coiled wire fabrics that consists in simultaneously connecting one section of fabric to a main body of fabric and forming a reserve section, and then shifting the reserve section to position it for connection to the preceding section and to make room for the next reserve section, substantially as described.

17. The improvement in the art of weaving coiled wire fabrics that consists in simultaneously connecting one section of fabric to a main body of fabric and forming a reserve section, then running a plurality of coils into the connected portions to form a cord, and then shifting the reserve section to position it for connection to the preceding section and to make room for the next reserve section, substantially as described.

18. The improvement in the art of weaving coiled wire fabric which consists in securing or holding the edge coil of a fabric, then moving a pre-formed coil into position to be interlocked therewith, then running in a coupling coil and a reserve coil, and then running in additional coupling coils to form a cord in the fabric, substantially as described.

19. The improvement in the art of weaving coiled wire fabrics which consists in simultaneously forming a plurality of coils, a number of said coils increasing the size of a previously woven reserve section of fabric, and connecting the same to the main body of fabric and the remaining coils interlocking to form a reserve section of fabric, substantially as described.

20. The improvement in the art of weaving coiled wire fabrics which consists in securing together but in non-interlocked relations, a reserve or pre-formed fabric section and the edge coil of a fabric body and then running a plurality of coils to interlock the body and section, to add to said section and form a new reserve fabric section, substantially as described.

21. The improvement in the art of weaving coiled wire fabrics which consists in securing the edge coil of the fabric body in position to receive another coil and in one operation adding a plurality of interlocked coils thereto, substantially as described.

22. The improvement in the art of weaving coiled wire fabric which consists in securing the edge coil of the fabric body in position to receive another coil and in one operation adding a plurality of interlocked coils thereto and forming a reserved section of fabric, substantially as described.

23. The improvement in the art of weaving coiled wire fabric which consists in securing the edge coil of the fabric body and in one operation adding a plurality of interlocked coils thereto and forming a reserved section of fabric, then releasing the fabric body and securing the new edge coil thereof, then continuing to form and add sections until the required quantity is completed, substantially as described.

24. The improvement in the art of weaving coiled wire fabric which consists in securing the edge coil of the fabric body and in one operation adding a plurality of interlocked coils thereto and forming a reserved section of fabric, then releasing the fabric body and securing the new edge coil thereof, then continuing to form and add sections until the required quantity is completed, interrupting at predetermined points the addition of fabric sections and running in extra coils to form cords in the fabric body, substantially as described.

25. The improvement in the art of weaving coiled wire fabric which consists in holding or placing the edge coil of a coiled wire fabric in position to receive another coil, then moving a pre-formed coil or the first coil of a pre-formed section into juxtaposition with said edge coil, then interlocking or coupling the juxtapositioned coils and simultaneously pre-forming another coil or section of fabric in readiness to be moved into juxtaposition in sequence, substantially as described.

In testimony whereof, I have hereunto set my hand, this 15th day of October, 1908, in the presence of two subscribing witnesses.

MARSHALL B. LLOYD.

Witnesses:
CHARLES GILBERT HAWLEY,
M. SIMON.